Sept. 11, 1956 G. F. ABBOTT, JR 2,762,865

TRUNK CIRCUIT

Filed Nov. 26, 1954

4 Sheets-Sheet 1

INVENTOR
G. F. ABBOTT, JR.
BY C. Mattice
ATTORNEY

INVENTOR
G. F. ABBOTT, JR.
BY C. Mattie
ATTORNEY

INVENTOR
G. F. ABBOTT, JR.
BY C. Mattice
ATTORNEY

TRUNK CIRCUIT

Filed Nov. 26, 1954 4 Sheets-Sheet 4

INVENTOR
G. F. ABBOTT, JR.
BY C. Mattice
ATTORNEY

United States Patent Office 2,762,865

Patented Sept. 11, 1956

2,762,865

TRUNK CIRCUIT

George F. Abbott, Jr., New York, N. Y., assignor to Bell Telephone Laboratories, Incorporated, New York, N. Y., a corporation of New York Application November 26, 1954, Serial No. 471,243

9 Claims. (Cl. 179—27)

Figures 1, 5:
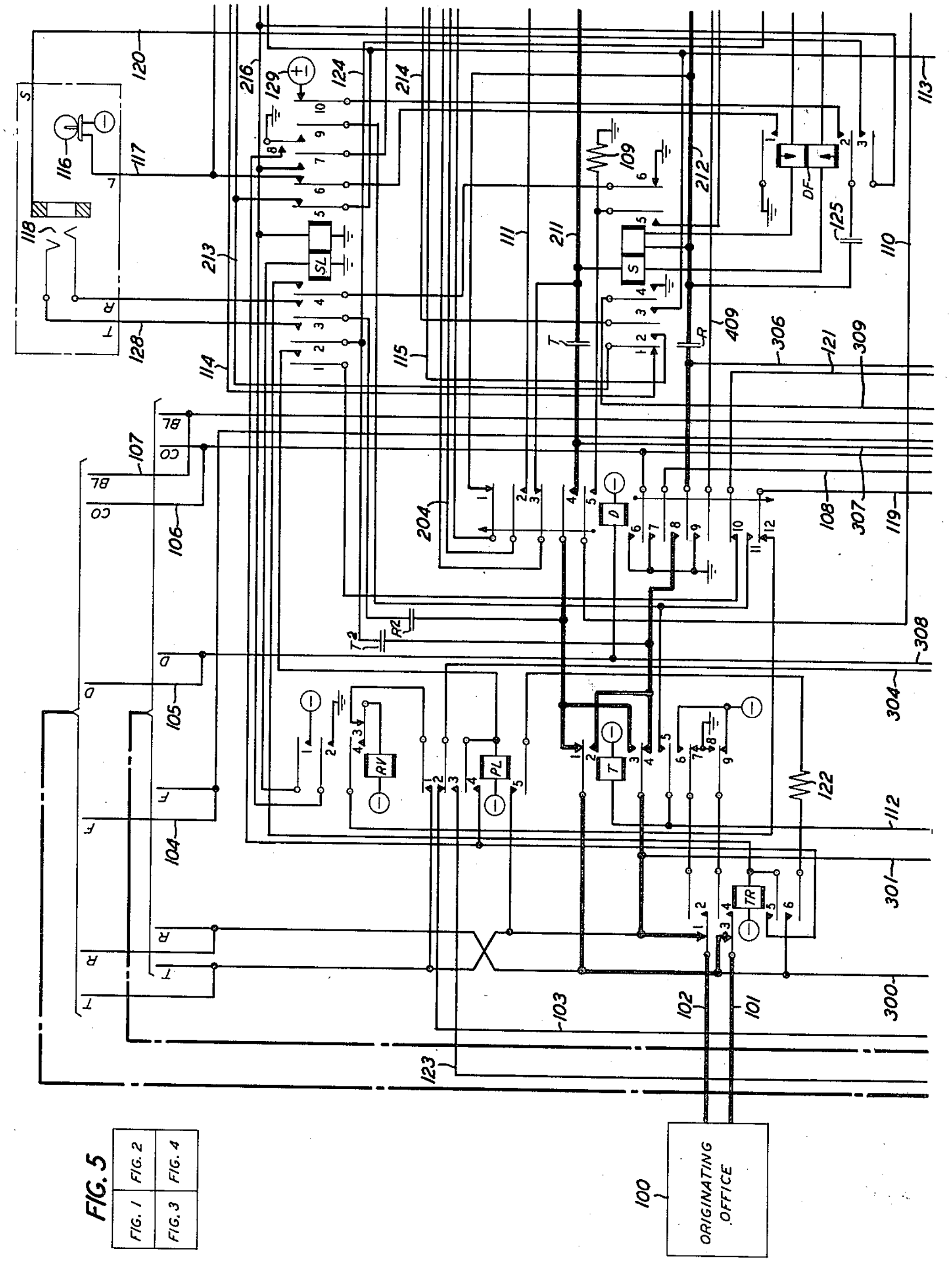

This invention relates to telephone systems and has for one of its objects increased facility in the operation of private branch exchanges.

In small private branch exchanges it is customary to have each incoming trunk appear at an operator's position and to provide a jack individual to each extension at the operator's position, the operator answering all incoming calls and completing them to the wanted extension. For large installations, such an arrangement requires an excessively large switchboard multiple and makes the work of the operator extremely difficult. Even where equipment is provided whereby calls within a private branch exchange may be completed automatically, the work of completing all incoming calls may require the services of a number of operators.

In accordance with the present invention means is provided whereby the services of an operator are required only to assist in the transfer of calls or in setting up calls where the calling subscriber does not know the number of the wanted extension.

One specific embodiment of the invention contemplates an installation large enough to warrant the use of exchange equipment of the type disclosed in United States Patent 2,585,904, granted to A. J. Busch, February 19, 1952, particularly in a telephone exchange building where the branch exchange is identified by an office code rather than by a complete designation and either the published directory number or the extension number is dialed following the office code of the exchange. However, the invention is not limited to offices having such a designation. A possible alternative might be an arrangement whereby a second dial tone would be given after which the calling subscriber would dial the number of the wanted extension or if the number was not known would dial a single arbitrary digit such as the digit 0.

A feature of the invention lies in means controlled only from the called substation for connecting an incoming trunk with an operator's position.

A further feature of the invention lies in means responsive to the release of a first established connection to permit the operator to set up a new connection.

Furthermore, if the first connection is not released promptly, means is provided under the control of the operator to force the release of the first connection.

In addition, special line equipment is provided which is reached in response to dialing the directory number, with means in the line equipment to automatically connect the operator with the trunk.

Figure 2:
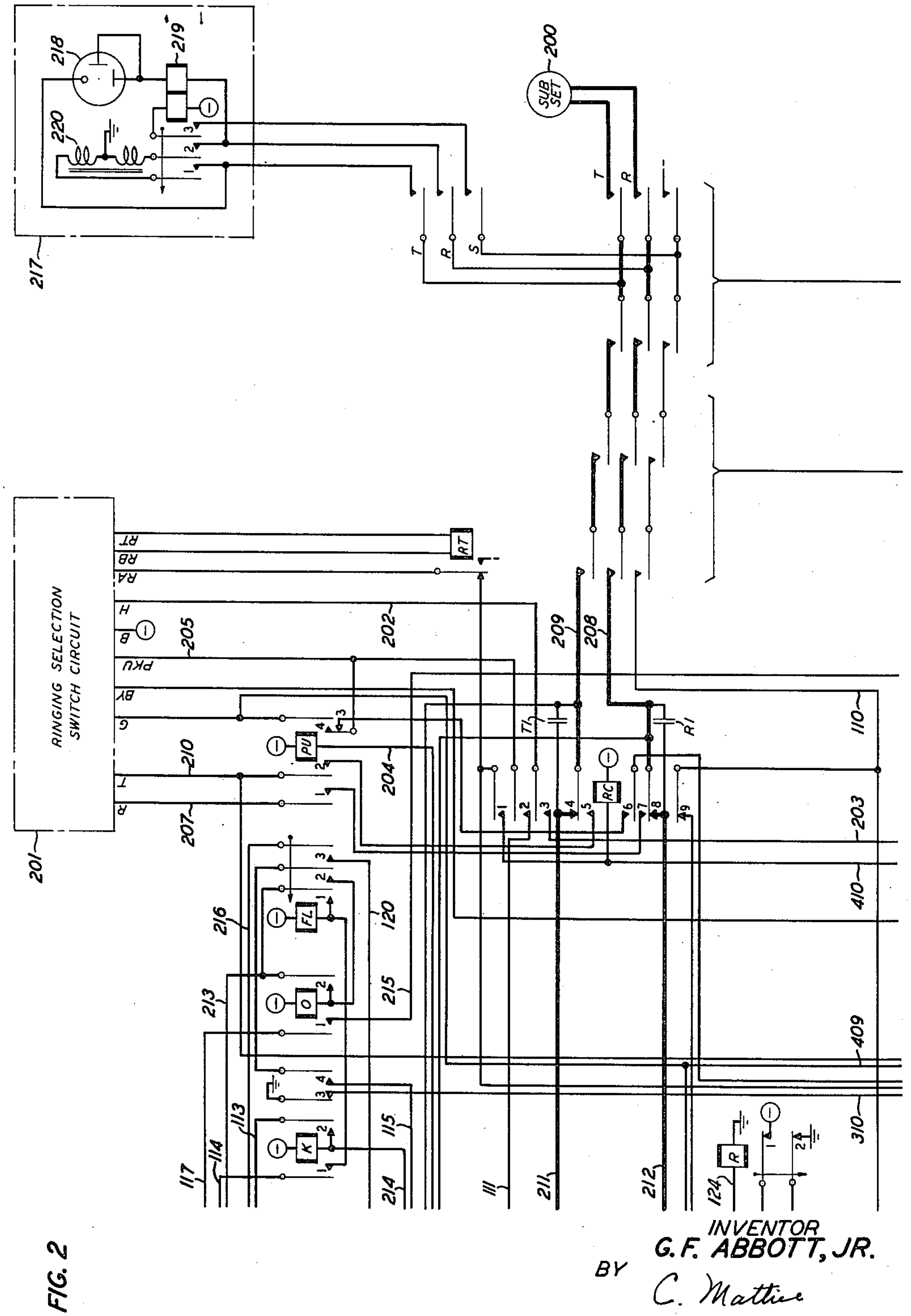
Figure 3:
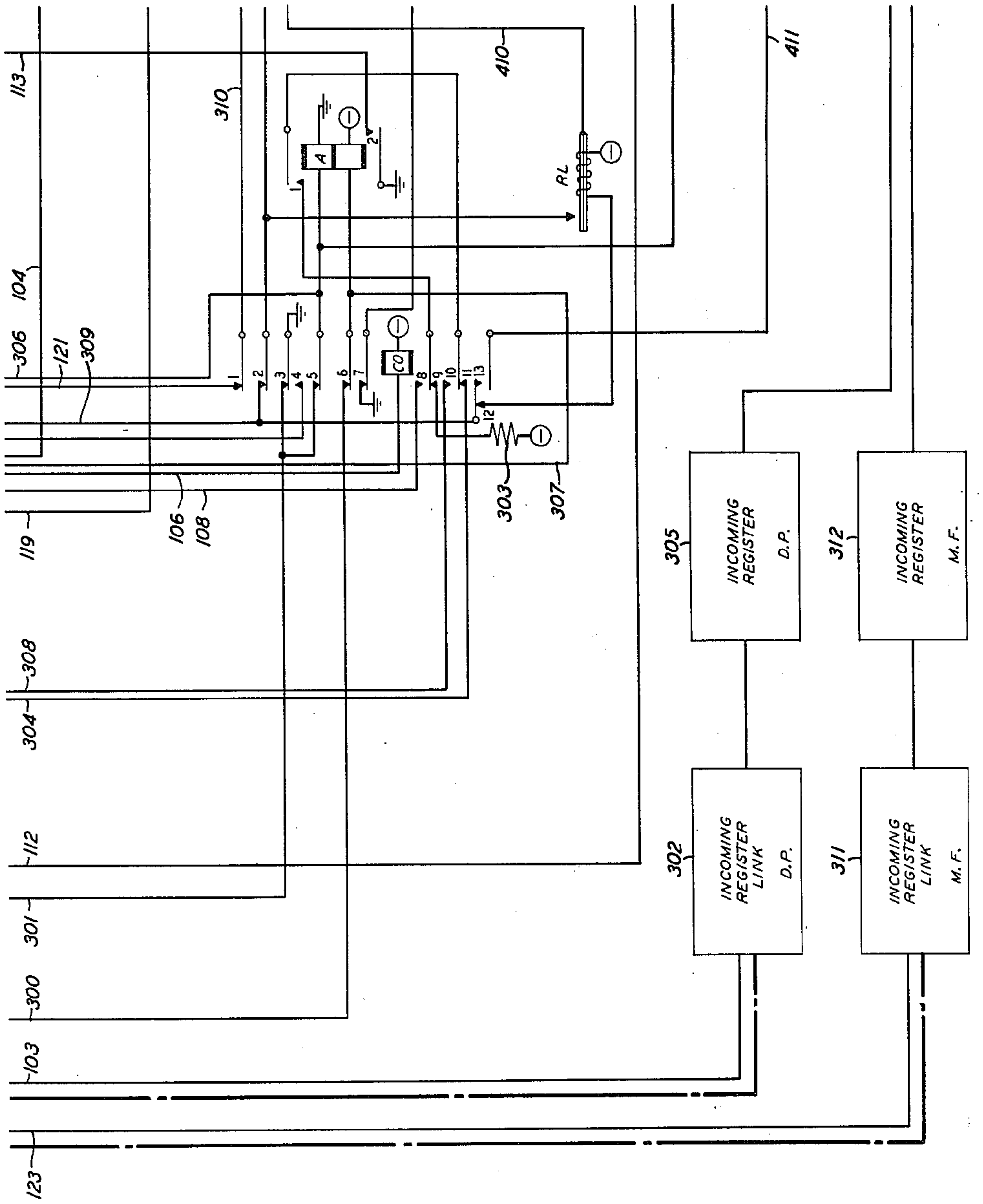
Figure 4:
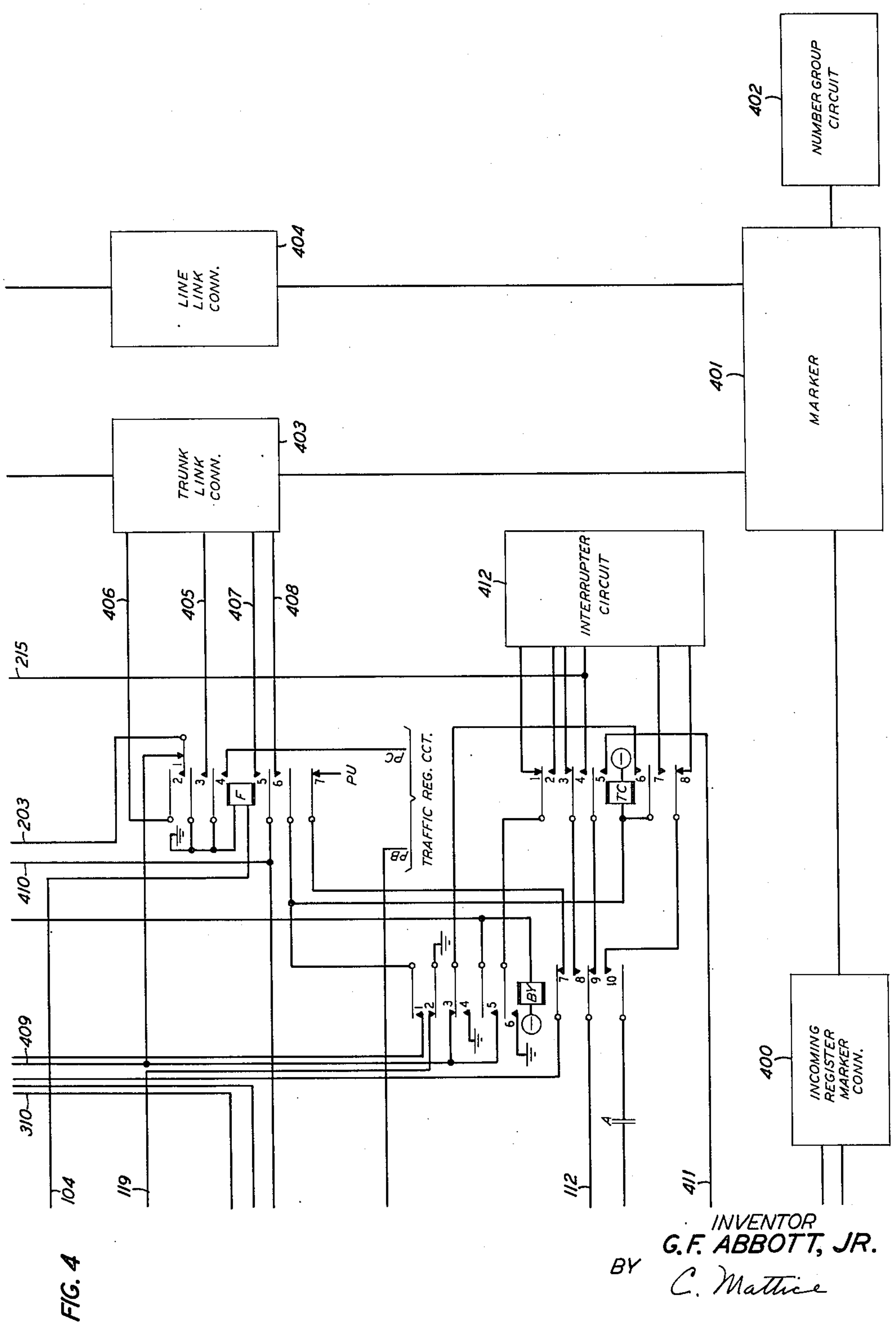

These and other features of the invention will be more clearly understood from a consideration of the following description read in connection with the drawing in which:

Figs. 1 to 4 show an incoming trunk circuit;

Fig. 1 also shows a lamp and jack at an operator's position and an originating office;

Fig. 2 also shows a ringing selection switch, a conventional subscriber substation and a special line circuit;

Fig. 3 also shows the incoming register links and incoming registers for use by the calling subscriber and by the operator;

Fig. 4 also shows the marker and associated equipment; and

Fig. 5 shows the manner in which Figs. 1 to 4 are to be arranged.

As previously stated, one particular embodiment of the invention contemplates the use of a crossbar system of the type disclosed in the above-identified Busch patent and that patent is included in the present disclosure, by reference, for the complete showing of the register, marker, etc.

Assuming first that the calling subscriber at the originating office 100 dials the exchange code and a four-digit extension number, the originating office will set up a connection between the calling line and the incoming trunk circuit, completing a circuit from battery through the lower winding of relay A, contact 6 of relay CO, conductor 300, contact 3 of relay TR, trunk conductor 101, through the loop provided at the originating office to conductor 102, contact 1 of relay TR, conductor 301, contact 5 of relay CO, to ground through the upper winding of relay A. It may be noted that conductor 301 also extends to ground over contact 3 of relay CO to provide better operating conditions for the equipment at the originating office. Relay A operates in this circuit and closes a start circuit for the dial pulse incoming register link 302 which may be traced from battery through resistor 303, contact 9 of relay CO, contact 1 of relay A, contact 11 of relay CO, conductor 304, contact 2 of relay PL, conductor 103, to the link 302. This link functions in the manner described in the above-identified Busch patent to select an idle dial pulse incoming register 305 and to connect the selected incoming register with the trunk circuit. When this connection has been completed, conductors 300 and 301 are extended to the incoming register 305 as well as conductors 104, 105, 106 and 107. When register 305 has been connected with the trunk, ground is connected to conductor 106 completing a circuit for relay CO which operates. Relay CO, in operating, disconnects relay A from the incoming trunk conductors causing relay A to release and open the start circuit for the incoming register link 302.

The incoming register 305 indicates to the originating office that it is ready to receive pulses and the originating office proceeds to transmit the designation of the wanted extension to the incoming register 305. When the designation has been completely received, register 305 connects ground to conductor 105 operating relay D. Relay D at its contact 6 connects ground to conductor 106 to hold relay CO operated. Relay D also reconnects relay A to the incoming trunk, the circuit extending from ground through the upper winding of relay A, conductor 306, contact 8 of relay D, contact 4 of relay T, contact 1 of relay TR to conductor 102 and from battery through the lower winding of relay A, conductor 307, contact 4 of relay D, contact 1 of relay T, contact 3 of relay TR, to conductor 101. Relay A reoperates and closes a circuit from ground over contact 7 of relay D, conductor 108, contact 8 of relay CO, contact 1 of relay A, contact 10 of relay CO, conductor 308, to battery through the winding of relay D. Relays D and CO, therefore, remain operated after the incoming register 305 and the register link 302 are released. Relay D, at its contact 5, connects ground through resistor 109, to conductor 110 to prepare for holding the switches.

Incoming register 305, having received the designation of the wanted extension operates the incoming register marker-connector 400 to select and connect with the idle marker 401, transferring the designation to the marker which functions as described in the above-identified Busch patent, operating the trunk link connector 403 to connect with the incoming trunk and with the trunk link switches. It also employs the number group circuit 402 to obtain the location of the wanted extension, which may be assumed to be subset 200 and then operates the line link frame connector 404 to obtain access to the wanted extension and the line link frame on which the extension appears. It also operates the select magnet in the ringing selection switch circuit 201 to prepare for the application of ringing current to the wanted extension. The marker then selects an idle channel by which the incoming trunk may be connected with subset 200 after which it operates the necessary magnets for completing the connection, tests the connection and releases, in turn releasing the incoming register.

Prior to the release of the marker 401 and after the operation of trunk link connector 403, the marker causes the incoming register 305 to connect battery to conductor 104, completing a circuit to ground through the winding of relay F. Relay F operates tand connects ground to conductor 405 to operate a relay in the trunk link connector 403 which extends conductors 406, 407 and 408 to the marker. If the wanted extension is idle and the call is to be charged for, the marker grounds conductor 408, completing a circuit over contact 6 of relay F to battery through the winding of relay TC. Relay TC operates in this circuit and locks over its contact 6, contact 3 of relay BY, conductor 409, to ground over contact 9 of relay D. Conductor 406 is used for causing ringing current to be applied to the tip conductor of a line and would probably not be used in a branch exchange. The marker also connects ground to conductor 407 to set the trunk for ringing, completing a circuit over contact 5 of relay F, conductor 410, to battery through the winding of relay RC, operating relay RC. With relay RC operated, the hold magnet of the ringing switch is operated under the control of the marker and the closure of the crosspoint completes the locking circuit for relay RC from battery through the winding of relay RC, contact 1 of relay RC, back contact of the ringing trip relay RT, over a contact of the ringing selection switch to conductor 409, and ground at contact 9 of relay D. When the marker has completed its operations, it releases relay F and the hold magnet of the ringing switch is held operated over conductor 202, contact 3 of relay RC, conductor 203, contact 1 of relay F, conductor 409 to ground at contact 9 of relay D. As soon as relay RC operates, a circuit is closed for operating relay PU, which may be traced from battery through the winding of relay PU, conductor 204, contact 2 of relay D, conductor 111, contact 2 of relay RC, conductor 205, to ground supplied over the operated crosspoint of the ringing switch. The ringing circuit for the wanted extension 200 extends from a ringing source over crosspoints of the ringing switch, and through the winding of relay RT to conductor 207, contact 1 of relay PU, contact 7 of relay RC, conductor 208, over the ring conductor through the switches and substation 200, back over the tip conductor through the switches to conductor 209, contact 5 of relay RC, contact 2 of relay PU, conductor 210, over crosspoints of the ringing switch to generator ground. Ringing tone is transmitted to the calling subscriber through condensers T1 and R1.

When the subscriber at substation 200 answers, the ringing trip relay RT operates, opening the locking circuit of relay RC. Relay RC releases, extending conductor 209 over contact 4 of relay RC, conductor 211, left winding of supervisory relay S, lower winding of differential relay DF, contact 1 of relay R to ground. Relay RC also extends conductor 208 over contact 8 of relay RC, conductor 212, right winding of relay S, upper winding of relay DF, contact 1 of relay R to battery. Relay S operates in this circuit, but relay DF which is differentially wound cannot operate at this time. It may be noted that relay RC also opens the locking circuit of the ringing switch hold magnet so that the ringing switch is restored to normal.

With relays TC and S operated, a circuit is closed from battery through the winding of relay T, conductor 112, contact 9 of relay BY, contact 5 of relay TC, conductor 411, contact 13 of relay CO, conductor 309, contact 4 of relay S to ground. Relay T operates in this circuit and reverses the connection of battery and ground to the incoming conductors 101 and 102 to give reverse battery supervision to the originating office. Relay T locks over its contact 5, contact 11 of relay D, conductor 119 to ground at contact 2 of relay BY. Relay S in operating also closes a circuit from battery through the winding of relay K, conductor 214, contact 3 of relay S, conductor 113, to ground to contact 2 of relay A. Relay K operates in this circuit and locks over its contact 2 and conductor 113 to ground at the contact 2 of relay A, independent of relay S.

With relay T operated, the talking circuit may be traced from conductor 102, contact 1 of relay TR, contact 3 of relay T, contact 4 of relay D, through condenser T, conductor 211, contact 4 of relay RC, conductor 209, through the switches and the called substation back to conductor 208, contact 8 of relay RC, conductor 212, condenser R, contact 8 of relay D, contact 2 of relay T, contact 3 of relay TR to conductor 101.

If the wanted extension is busy or no channel is available, the call will be disposed of in the manner described in the above-identified Busch patent.

If after the subscriber at extension 200 has talked with the calling subscriber he finds that the call should be transferred to some other extension, the subscriber at extension 200 may obtain the services of an operator by flashing, that is by operating and releasing his switchhook. When the switchhook breaks the circuit or relay S that relay releases, closing a circuit from ground at contact 2 of relay A, conductor 113, contact 5 of relay SL, conductor 213, contact 1 of relay S, conductor 114, contact 1 of relay K, to battery through the winding of relay FL. Relay FL is slow to operate so that accidental jiggling of the switchhook will not cause it to operate and summon the operator unnecessarily. Relay FL operates in the above-traced circuit and locks over its contact 1, conductor 213, contact 5 of relay SL, conductor 113, to ground at contact 2 of relay A. When the switchhook is released, relay S reoperates, closing a circuit from ground at contact 2 of relay A, conductor 113, contact 5 of relay SL, conductor 213, contact 2 of relay S, conductor 115, contact 4 of relay K, contact 2 of relay FL to battery through the winding of relay O. Relay O operates in this circuit and locks over its contact 2, conductor 213, contact 5 of relay SL, conductor 113, to ground at contact 2 of relay A.

At its contact 1 relay O closes a circuit from battery through lamp 116 which is individual to this trunk circuit at an operator's position, conductor 117, contact 1 of relay O, to conductor 215 which extends to a source of interrupted ground in the interrupter circuit 412. Lamp 116, therefore, flashes to indicate to the operator that her services are required for transferring the call. Since relays FR and O are locked under the control of relay A independent of relay S, this flashing signal is independent of further operations of the switchhook. Since relay T is locked under the control of relay D, the flash by the called extension is not transmitted back to the originating office.

The operator, observing the flash of lamp 116 inserts the plug of a cord at her position in jack 118. Battery connected to the sleeve of the cord completes a circuit over the sleeve of jack 118, conductor 120, contact 3 of relay FL, conductor 216, to ground through the right winding of relay SL. Relay SL operates in this circuit and locks over its contact 7 to battery on conductor 120, independent of relay FL. With relay SL operated the locking circuits of relays O and FL are opened and these relays release, extinguishing lamp 116. With relay SL operated the tip and ring of jack 118 are connected over contacts 2 and 3 of relay SL through condensers T–2 and R–2 to the talking circuit above-traced between the calling and called subscribers so that the operator may talk with the parties to the connection and learn the identity of the person to whom the call should be transferred. She will then instruct the subscriber at extension 200 to hang up.

Release by the called extension permits relay S to release and closes a circuit from battery through the winding of relay TR, contact 4 of relay SL, contact 6 of relay S to ground. Relay TR operates and locks over its contact 5 to ground at contact 8 of relay SL. With relay TR operated, the windings of relay A are disconnected from the incoming trunk and conductors 101 and 102 and these conductors are extended over contacts 2 and 4 of relay TR to battery and ground over contacts 6 and 8 of relay T. Relay SL also provides a locking circuit for relay T which extends over contact 5 of relay T to ground at contact 9 of relay SL. Therefore, the supervision at the originating office is not disturbed during these functions.

With relay A disconnected from the incoming trunk conductors, that relay releases in turn releasing relay K, relay D and relay CO. With these relays released, a circuit is closed from battery through the winding of relay PL, contact 1 of relay SL, contact 10 of relay D, conductor 121, contact 1 of relay CO, conductor 310 to ground at contact 3 of relay K. Relay PL operates and locks over its contact 4 to ground at contact 8 of relay SL. With relay PL operated a local circuit is closed for relay A which may be traced from ground through the upper winding of relay A, contact 5 of relay CO, conductor 301, contact 5 of relay PL, resistor 122, contact 6 of relay TR, conductor 300, contact 6 of relay CO, to battery through the lower winding of relay A. Relay A reoperates in this circuit and recloses the register start circuit. With relay PL operated, this circuit now extends to the multifrequency incoming register link 311 since the operator's position is assumed to be equipped for multi-frequency pulsing.

The circuit may be traced from battery through resistor 303, contact 9 of relay CO, contact 1 of relay A, contact 11 of relay CO, conductor 304, contact 3 of relay PL, conductor 123, to register link 311. This link functions in a manner similar to link 302 to select an idle multifrequency incoming register such as register 312 and connect the selected register with the trunk over conductors 300, 301 and 104 to 107 which extend in multiple to both register links.

It will, of course, be understood that the use of dial pulse registers for the incoming call and multifrequency registers for use by the operator is merely illustrative. The type of incoming register to be used for an incoming call would be determined by the nature of the originating office and under certain conditions both the operator and the originating office might use the same type of incoming register.

When the multifrequency register is ready to receive pulses it connects ground to conductor 301, completing a circuit over contact 1 of relay PL, contact 3 and winding of relay RV to battery. Relay RV operates in this circuit and locks over its contact 4, contact 12 of relay D, conductor 119 to ground at contact 2 of relay BY. With relay RV operated, battery is connected over its contact 1 to ground through the left winding of relay SL, holding that relay operated. At its contact 2, relay RV connects ground in shunt of the right winding of relay SL to cause the sleeve lamp in the cord circuit at the operator's position to light as a signal to the operator that she may commence to operate her keyset. As previously described, relay CO operates as soon as the incoming register 312 is connected with the trunk.

When the operator has finished pulsing the number, she withdraws her cord but relay SL is held operated under the control of relay RV. Relay D is operated under the control of the register, as previously described, in turn releasing relays RV, SL, TR and PL. Relay D recloses the holding circuit for relay T before it is opened by the release of relay SL. The completion of the call and response by the new called extension take place as previously described.

If, when instructed to do so by the operator, the subscriber at extension 200 does not restore his receiver promptly, the operator may force the release by operating her ringing key which connects battery to conductor 128, completing a circuit over contact 2 of relay SL, conductor 124, to ground through the winding of relay R. Relay R operates and disconnects battery and ground from the windings of relay S to cause that relay to release and prepare the trunk for setting up the new connection.

When the conversation is ended, release at the originating office releases relay A which in turn releases relays D, CO and K. The release of relay D opens one connection of ground through resistor 107 with the sleeve conductor 110 but the switch are held operated under the control of relay S until release takes place at the called extension 200. If the subscriber at extension 200 does not release promptly, a circuit is closed by the release of relay CO from battery through the heater winding of thermal relay RL, contact 12 of relay CO, conductor 309, to ground at contact 4 of relay S. After a time interval relay RL closes its contact, completing a circuit from ground over contact 4 of relay S, conductor 309, contact 2 of relay CO, contact of relay RL, conductor 410 to battery through the winding of relay RC. Relay RC operates, opening the tip and ring conductors leading to relay S and causing relay S to release and open the connection of ground to conductor 110 to permit the switches to release and the trunk to restore to normal.

To handle calls originated by subscribers knowing only the published directory number, a number of line circuits are provided similar to that shown at 217 which will be arranged as a P. B. X hunting group. The line circuit includes a gas-filled tube 218 which is bridged across the tip and ring terminals of the line circuit in series with one winding of relay 219. The call is set up in the manner above-described and, with ringing relay RC operated, ringing current is connected to the line terminals causing tube 218 to break down and operate relay 219. Relay 219 locks in a circuit from battery through its left winding over its contact 3 and the sleeve of the established connection to conductor 110, contact 5 of relay D to ground through resistor 109. Relay 219 connects ground through the two windings of retard coil 220 to the tip and ring conductors of the talking circuit.

Ground connected to the ring conductor operates relay RT to release relay RC and terminate the ringing. With relay RC released, ground on the ring conductor 208 is extended over contact 8 of relay RC, conductor 212, right winding of relay S, upper winding of relay DF, contact 1 of relay R, to battery causing relay S to operate. Ground on the tip conductor 209 shunts the lower winding of differential relay DF so that that relay now operates. Relay DF at its contact 2 closes a circuit from ringing current source 129, contact 10 of relay SL, contact 2 of relay DF, condenser 125, to the ring conductor 212 to continue the ringing signal to the calling subscriber. At its contact 1 relay DF connects ground over contact 6 of relay SL to conductor 117 to light lamp 116 at the operator's position. In this case the lamp 116 is lighted steadily to inform the operator that this is an original incoming call.

When the operator inserts the plug of a cord in the jack 118, battery on the sleeve of the cord completes a circuit over conductor 120, contact 3 of relay DF, conductor 216, to ground through right winding of relay SL. Relay SL in operating disconnects the ringing tone from the trunk and connects the incoming tip and ring conductors to the jack of the operator's position as previously described. Having learned what extension the calling subscriber requires, the operator operates her ringing key causing relay R to operate, as previously described, to release the switches and disconnect the line circuit 217 from the trunk, returning that line circuit to normal. The completion of the connection to the desired extension then takes place as above-described. Since the holding time for the special line circuits is very short, a comparatively small number of such circuits is required.

What is claimed is:

1. In a private branch exchange, trunks incoming to the exchange and terminating in trunk circuits at said exchange, switches, control equipment for said switches, called line circuits, means to connect said control equipment with an incoming trunk circuit, means for operating said control equipment over said trunk to establish a connection over said switches from said trunk circuit to one of said line circuits, an operator's position, a signal and a talking circuit individual to said trunk circuit at said operator's position, and means in said trunk circuit controlled only over said connected called line circuit to operate said individual signal.

2. In a private branch exchange, trunks incoming to the exchange and terminating in trunk circuits at said exchange, switches, control equipment for said switches, called line circuits, means to connect said control equipment with an incoming trunk circuit, means for operating said control equipment over said trunk to establish a connection over said switches from said trunk circuit to one of said line circuits, an operator's position, a signal and a talking circuit individual to said trunk circuit at said operator's position, means in said trunk circuit controlled only over said connected called line circuit to operate said individual signal, and means to connect said operator equipment with said trunk circuit.

3. In a private branch exchange, trunks incoming to said exchange and terminating in trunk circuits at said exchange, switches, control equipment for said switches, line circuits, means to connect said control equipment with an incoming trunk circuit, means for operating said control equipment over said trunk to establish a connection over said switches from said trunk circuit to one of said line circuits, an operator's position, a signal and a talking circuit individual to said trunk circut at said operator's position, means in said trunk circuit controlled only over said connected line circuit to operate said individual signal, means to connect said operator equipment with said trunk circuit, and means under the control of said operator equipment to release said established connection and establish a connection between said incoming trunk circuit and another one of said line circuits.

4. In a private branch exchange, trunks incoming to said exchange and terminating in trunk circuits at said exchange, switches, control equipment for said switches, line circuits, means under the control of an incoming trunk to connect said control equipment with said trunk and to operate said control equipment in accordance with the designation of a wanted line circuit, said control equipment effective to establish a connection from said incoming trunk circuit to said designated line circuit and to release from said trunk circuit, an operator's position, a signal and a talking circuit individual to said trunk circuit at said operator's position, operator equipment at said position, means in said trunk circuit controlled from said one line circuit to operate said individual signal, means to connect said operator equipment with said trunk circuit, means responsive to the release of said one line to render said operator equipment effective to operate said control equipment to establish a connection between said incoming circuit and another one of said line circuits, and means under the control of said operator equipment to force the release of said one line.

5. In a private branch exchange, trunks incoming to said exchanges and terminating in trunk circuits at said exchange, switches, control equipment for said switches, line circuits, means to connect said control equipment with an incoming trunk circuit, means for operating said control equipment over said trunk to establish a connection over said switches from said trunk circuit to one of said line circuits, an operator's position, a supervisory relay in said trunk circuit operated under the control of said one line circuit, means under the control of said supervisory relay for transmitting a supervisory signal over the incoming end of said trunk, a signal and a talking circuit individual to said trunk circuit at said operator's position, means in said trunk circuit controlled only over said connected line circuit to operate said individual signal, means to connect said operator equipment with said trunk circuit, means under the control of said operator equipment to release said established connection and establish a new connection between said incoming trunk circuit and another one of said line circuits, and means also under the control of said operator equipment to maintain said supervisory signal during the release of said established connection and the establishment of said new connection.

6. In a private branch exchange, trunks incoming to said exchange and terminating in trunk circuits at said exchange, switches, control equipment for said switches, called line circuits, means to connect said control equipment with an incoming trunk circuit, means for operating said control equipment over said trunk to establish a connection over said switches from said trunk circuit to one of said line circuits, an operator's position, a signal and a talking circuit individual to said trunk circuit at said operator's position, means in said trunk circuit controlled only over said connected called line circuit to operate said individual signal, means to connect said operator equipment with said trunk circuit, means under the control of said operator equipment to establish a new connection between said incoming trunk circuit and another one of said line circuits, and means under the joint control of the connection of said operator equipment with said trunk circuit and the release of said established connection to render said operator equipment effective to establish said new connection.

7. In a private branch exchange, trunks incoming to said exchange and terminating in trunk circuits at said exchange, switches, control equipment for said switches, a plurality of first line circuits identified by individual designations, a plurality of other line circuits identified by a common designation, means under the control of an incoming trunk to connect said control equipment with said trunk and to operate said control equipment in accordance with the designation of a wanted line circuit, said control equipment effective to establish a connection from said incoming trunk circuit to a designated line circuit and to release from said trunk circuit, an operator's position, a signal and a talking circuit individual to said trunk circuit at said operator's position, operator equipment at said position, means in said trunk circuit controlled from one of said first line circuits to flash said signal, means under the control of one of said other line circuits to operate said signal steadily, means under the control of said signal operating means to connect said operator equipment with said trunk circuit, means responsive to the release of said one first line to render said operator equipment effective to operate said control equipment to establish a connection between said incoming trunk circuit and another one of said line circuits, and means under the control of said operator equipment to force the release of a connection with one of said other line circuits.

8. In a private branch exchange, trunks incoming to said exchange and terminating in trunk circuits at said exchange, switches, control equipment for said switches, a plurality of first line circuits having a switchhook, said lines identified by individual designations, a plurality of other line circuits identified by a common designation, each of said other line circuits including a gas-filled tube, means controlled over an incoming trunk to connect said control equipment with said trunk and to operate said control equipment in accordance with the designation of a wanted line circuit, said control equipment effective to establish a connection from said incoming trunk circuit to a designated line circuit and to release from said trunk circuit, an operator's position, a signal and a talking circuit individual to said trunk circuit at said operator's position, operator equipment at said position, means in said trunk circuit responsive to the operation of the switchhook at one of said first line circuits to flash said signal, means responsive to the operation of the gas-filled tube means on one of said other line circuits to operate said signal steadily, means under the control of said signal operating means to connect said operator equipment with said trunk circuit, means responsive to the release of said one first line to render said operator equipment effective to operate said control equipment to establish a connection between said incoming trunk circuit and another one of said line circuits, and means under the control of said operator equipment to force the release of a connection with one of said other line circuits.

9. In a private branch exchange, trunks incoming to said exchange and terminating in trunk circuits at said exchange, switches, control equipment for said switches, a plurality of first line circuits having a switchhook, said lines identified by individual designations, a plurality of other line circuits identified by a common designation, each of said other line circuits including a gas-filled tube and means under the control of said gas-filled tube for grounding both sides of said line circuit, means under the control of an incoming trunk to connect said control equipment with said trunk and to operate said control equipment in accordance with the designation of a wanted line circuit, said control equipment effective to establish a connection from said incoming trunk circuit to a designated line circuit and to release from said trunk circuit, an operator's position, a signal and a talking circuit individual to said trunk circuit at said operator's position, operator equipment at said position, means in said trunk circuit responsive to the operation of the switchhook at one of said first line circuits to flash said signal, means responsive to the grounding of both sides of said line circuit by one of said other line circuits to operate said signal steadily, means under the control of said signal operating means to connect said operator equipment with said trunk circuit, means responsive to the release of said one line to render said operator equipment effective to operate said control equipment to establish a connection between said incoming trunk circuit and another one of said line circuits, and means under the control of said operator equipment to force the release of the connection with one of said other line circuits.

References Cited in the file of this patent

UNITED STATES PATENTS

| | | |
|---|---|---|
| 2,327,201 | Martins | Aug. 17, 1943 |
| 2,327,436 | Koechling | Aug. 24, 1943 |
| 2,405,332 | Schroephal | Aug. 6, 1946 |